United States Patent
Needham et al.

(10) Patent No.: US 11,093,196 B2
(45) Date of Patent: Aug. 17, 2021

(54) METHOD, SYSTEM, AND DEVICE FOR SELECTING AND DISPLAYING INFORMATION ON A MOBILE DIGITAL DISPLAY DEVICE

(71) Applicant: Intel Corporation, Santa Clara, CA (US)

(72) Inventors: Bradford H. Needham, North Plains, OR (US); Edward R. Harrison, Beaverton, OR (US); Robin L. Jordan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/339,348

(22) Filed: Oct. 31, 2016

(65) Prior Publication Data

US 2017/0116964 A1 Apr. 27, 2017

Related U.S. Application Data

(63) Continuation of application No. 13/997,682, filed on Oct. 7, 2013, now Pat. No. 9,483,970.

(51) Int. Cl.
*G06F 3/14* (2006.01)
*G09G 5/00* (2006.01)
*G06Q 30/02* (2012.01)

(52) U.S. Cl.
CPC .......... *G06F 3/1423* (2013.01); *G09G 5/003* (2013.01); *G06Q 30/0241* (2013.01); *G09G 2370/022* (2013.01); *G09G 2370/025* (2013.01); *G09G 2370/16* (2013.01); *G09G 2380/06* (2013.01); *G09G 2380/10* (2013.01)

(58) Field of Classification Search
None
See application file for complete search history.

(56) References Cited

U.S. PATENT DOCUMENTS

| | | |
|---|---|---|
| 6,236,330 B1 | 5/2001 | Cohen |
| 2002/0009978 A1* | 1/2002 | Dukach ............... G08G 1/01 455/99 |
| 2002/0180658 A1 | 12/2002 | Saito |

(Continued)

FOREIGN PATENT DOCUMENTS

| | | |
|---|---|---|
| JP | 2009163126 | 7/2009 |
| KR | 1020090101523 | 9/2009 |
| WO | 2013147833 | 10/2013 |

OTHER PUBLICATIONS

International Search Report and Written Opinion received for International Application No. PCT/US2012/031389, dated Nov. 23, 2012, 10 pages.

(Continued)

*Primary Examiner* — Shaheda A Abdin
(74) *Attorney, Agent, or Firm* — Hanley, Flight & Zimmerman, LLC

(57) ABSTRACT

A method, system, and device for selecting and displaying information on a mobile digital display device includes determining preference criteria for local viewers of the mobile digital information display device, selecting digital information to be displayed on the mobile digital information display device as a function of the preference criteria, and displaying the selected information on a display of the mobile digital information device.

17 Claims, 8 Drawing Sheets

(56) References Cited

U.S. PATENT DOCUMENTS

| | | | | |
|---|---|---|---|---|
| 2008/0288406 A1* | 11/2008 | Seguin | .................. | G06Q 30/02 |
| | | | | 705/50 |
| 2009/0256697 A1* | 10/2009 | Tallinger | .............. | B60Q 1/2611 |
| | | | | 340/472 |
| 2010/0305844 A1* | 12/2010 | Choi | .................. | G01C 21/3423 |
| | | | | 701/533 |
| 2012/0229640 A1* | 9/2012 | Angel | ................... | G06Q 30/02 |
| | | | | 348/148 |

OTHER PUBLICATIONS

MAYA Design, Inc., "MAYA Sprocket," <http://maya.com/sprocket>, Sep. 5, 2011, 3 pages.

Pest et al., "Evaluation of Work Zone Speed Advisory Systems," 2004, retrieved from <http://ntl.bts.gov/lib/jpodocs/repts_te/14057_files/14057.pdf>, 36 pages.

United States Patent and Trademark Office, "Non-Final Office Action", issued in connection with U.S. Appl. No. 13/997,682, dated May 21, 2015, (19 pages).

United States Patent and Trademark Office, "Final Office Action", issued in connection with U.S. Appl. No. 13/997,682, dated Nov. 19, 2015, (20 pages).

United States Patent and Trademark Office, "Advisory Action", issued in connection with U.S. Appl. No. 13/997,682, dated Apr. 12, 2016, (9 pages).

United States Patent and Trademark Office, "Notice of Allowance and Fee(s) Due", issued in connection with U.S. Appl. No. 13/997,682, dated Jun. 16, 2016, (9 pages).

* cited by examiner

METHOD, SYSTEM, AND DEVICE FOR SELECTING AND DISPLAYING INFORMATION ON A MOBILE DIGITAL DISPLAY DEVICE

CROSS-REFERENCE TO RELATED APPLICATION

The present application is a continuation application of U.S. application Ser. No. 13/997,682, entitled "METHOD, SYSTEM, AND DEVICE FOR SELECTING AND DISPLAYING INFORMATION ON A MOBILE DIGITAL DISPLAY DEVICE," which was filed on Oct. 7, 2013.

BACKGROUND

Billboards are used to display information, such as advertisements, notifications, directions, and the like, to nearby individuals of the local public. The information displayed on the billboards is static and typically embodied as physical print on a substrate medium such as a paper, plastic, or canvas. Billboards may be immobile, such as a highway billboard, or mobile. Mobile billboards are generally attached to a mobile structure such as a vehicle or are moved about by individuals (e.g., a wearable billboard). Regardless, the information displayed on such mobile billboards remains static, similar to a fixed immobile billboard, regardless of the location or movement of the billboard itself.

Digital signs are also used to display information. Unlike billboards, the information displayed by typical digital signs may change over time. For example, a digital sign may be configured to display certain information one day and different information on a different day. Many digital signs are immobile and are used to display various information to the general public in the vicinity of the digital sign or as they pass by the digital sign (e.g., a digital highway sign configured to display traffic information, a crosswalk digital sign, etc.).

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
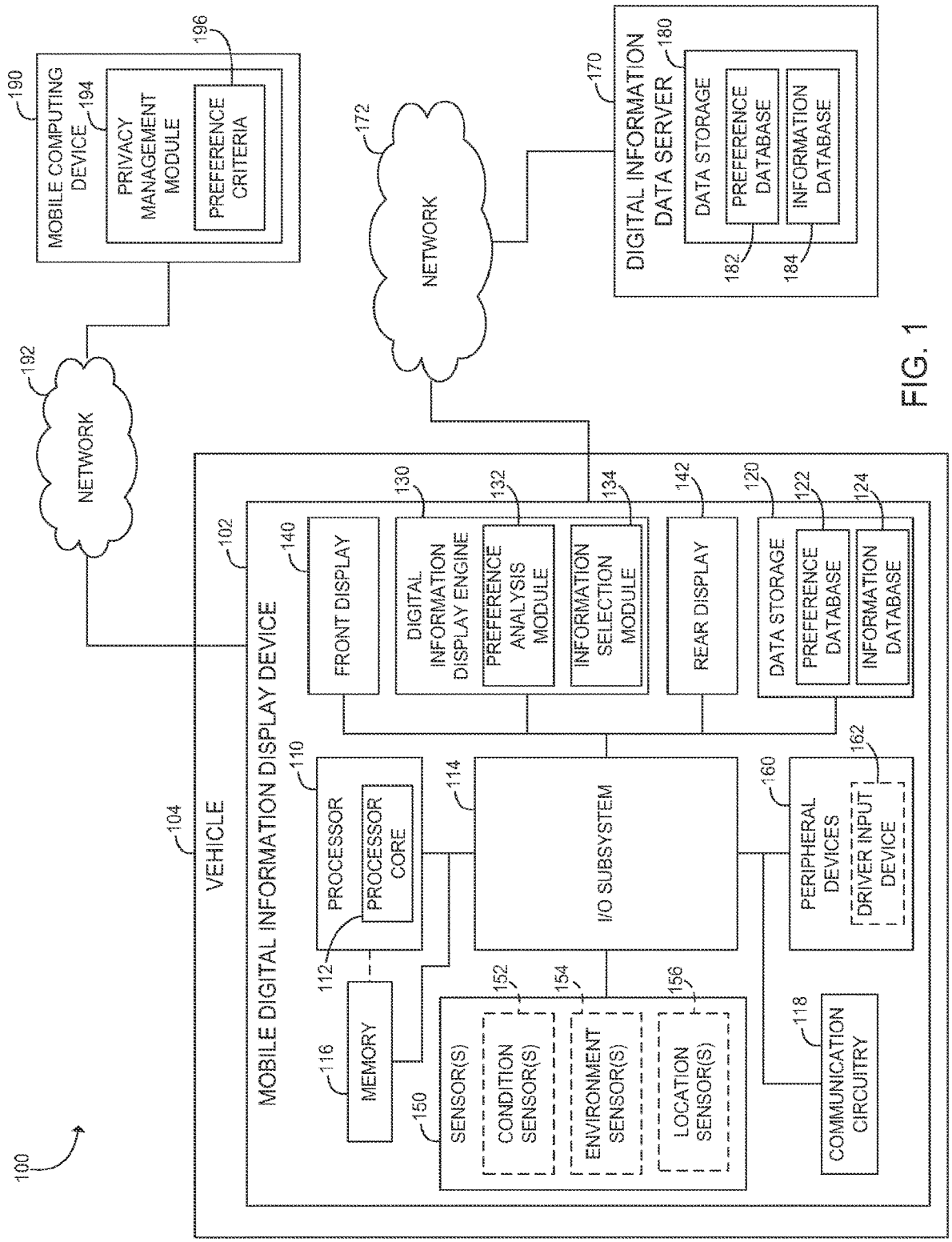
FIG. 1 is a simplified block diagram of at least one embodiment of a system for determining and displaying digital information on a mobile digital information display.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions carried by or stored on a transitory or non-transitory machine-readable medium, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, in one embodiment, a system 100 for selecting and displaying digital information includes a mobile digital information display device 102 configured to display digital information to local viewers while in motion (e.g., while being moved from one location to another), as well as while stationary. Such digital information may be embodied as, for example, advertisements, notifications, directions, emergency instructions, and/or other information capable of being displayed on a digital display. The particular digital information to be displayed on the mobile digital information display device at a particular time is selected based on determined preference criteria of the local viewers (i.e., the inferred or local viewers).

The preference criteria may include any type of information about the local viewers, as individuals or as a group, that may be used to select or otherwise determine which data to display on the mobile digital information display device. For example, the preference criteria may be indicative of preferences of the local viewer(s) such as product preferences, purchasing history, interests, and/or other likes/dislikes. Additionally, the preference criteria may be indicative of characteristics of the local viewer(s) such as gender, age, or nationality. Yet further, the preference criteria may be indicative of a context of the viewer(s) such as whether the local viewer is standing or walking, shopping or attending a meeting or event, and/or other criteria data that is indicative of how receptive the local viewer is to watching the mobile digital information display (which may, for example, affect the degree to which the content displayed on the digital mobile information display device is tailored to that local viewer's preferences).

It should be appreciated that because the display device 102 is mobile, the local population of viewers change over time. As such, in one embodiment the preference criteria of the local viewers is inferred based on the context data of the mobile digital information display device 102. To do so, the context data is compared to demographic data to determine the preference criteria for the viewers based on the likely local demographics. The context data of the mobile digital information display device 102 may be embodied as any type of data that defines a condition or aspect of the display device 102. For example, the context data may include data indicative of a current or future (e.g., predicted) location of the display device 102, data indicative of an environmental condition (e.g., whether it is raining, snowing, foggy, etc.) of the current or future location of the display device 102, data indicative of the speed or direction of travel (e.g., navigation data) of the display device 102, data indicative of the time of day, the date, or time of year, and/or any other data indicative of the context of the display device 102. Such context data may be obtained using sensors of the display device 102 itself or from other remote sources. Additionally, in some embodiments, as discussed in more detail below, the preference criteria may be obtained directly from mobile computing devices of the people within the vicinity of the display device 102.

The digital information to be displayed on the mobile digital information display device 102 is selected based on the determined preference criteria. To do so, the preference criteria may be compared to characteristics of the digital information. For example, if the preference criteria indicate that the local demographics is composed of a large population of non-native speakers, an advertisement in the native language of the local population may be selected. Additionally, in some embodiments, the context data of the display device may be compared to the characteristics of the digital information to narrow further the selection process. For example, if the context data indicates that the display device 102 is temporarily stationary, digital information having a more active presentation (e.g., moving graphics) may be selected. Conversely, if the context data indicates that the display device 102 is in motion, digital information having a more static presentation may be selected.

The mobile digital information display device 102 may be embodied as any type of mobile computing device capable of performing the functions described herein. In the illustrative embodiment, the display device 102 is attached or secured to a vehicle 104. However, in other embodiments, the mobile digital information display device 102 may be attached to other mobile structures or otherwise movable by one or more individuals. For example, in some embodiments, the mobile digital information display device 102 may be embodied as a sandwich sign carried by a person, as electronic clothing worn by a person, or the like. Alternatively, the mobile digital information display device 102 may be embodied as a mobile computer such as a smart phone, a computing tablet, a laptop computer, or the like.

In the illustrative embodiment of FIG. 1, the mobile digital information display device 102 includes a processor 110, an I/O subsystem 114, a memory 116, communication circuitry 118, data storage 120, a digital information display engine 130, a front display 140, and a rear display 142, and one or more peripheral devices 160. In some embodiments, several of the foregoing components may be incorporated on a motherboard of the mobile digital information display device 102, while other components may be communicatively coupled to the motherboard via, for example, a peripheral port. Furthermore, it should be appreciated that the mobile digital information display device 102 may include other components, sub-components, and devices commonly found in a mobile computing device, which are not illustrated in FIG. 1 for clarity of the description.

The processor 110 of the mobile digital information display device 102 may be embodied as any type of processor capable of executing software/firmware, such as a microprocessor, digital signal processor, microcontroller, or the like. The processor 110 is illustratively embodied as a single core processor having a processor core 112. However, in other embodiments, the processor 110 may be embodied as a multi-core processor having multiple processor cores 112. Additionally, the mobile digital information display device 102 may include additional processors 120 having one or more processor cores 112.

The I/O subsystem 114 of the mobile digital information display device 102 may be embodied as circuitry and/or components to facilitate input/output operations with the processor 110 and/or other components of the mobile digital information display device 102. In some embodiments, the I/O subsystem 114 may be embodied as a memory controller hub (MCH or "northbridge"), an input/output controller hub (ICH or "southbridge"), and a firmware device. In such embodiments, the firmware device of the I/O subsystem 114 may be embodied as a memory device for storing Basic Input/Output System (BIOS) data and/or instructions and/or other information (e.g., a BIOS driver used during booting of the mobile digital information display device 102). However, in other embodiments, I/O subsystems having other configurations may be used. For example, in some embodiments, the I/O subsystem 114 may be embodied as a platform controller hub (PCH). In such embodiments, the memory controller hub (MCH) may be incorporated in or otherwise associated with the processor 110, and the processor 110 may communicate directly with the memory 116 (as shown by the hashed line in FIG. 1). Additionally, in other embodiments, the I/O subsystem 114 may form a portion of a system-on-a-chip (SoC) and be incorporated, along with the processor 110 and other components of the mobile digital information display device 102, on a single integrated circuit chip.

The processor 110 is communicatively coupled to the I/O subsystem 114 via a number of signal paths. These signal paths (and other signal paths illustrated in FIG. 1) may be embodied as any type of signal paths capable of facilitating communication between the components of the mobile digital information display device 102. For example, the signal paths may be embodied as any number of point-to-point links, wires, cables, light guides, printed circuit board traces, via, bus, intervening devices, and/or the like.

The memory 116 of the mobile digital information display device 102 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask readonly memory (ROM) devices, erasable programmable ROM (EPROM), electrically erasable programmable ROM (EEPROM) devices, flash memory devices, and/or other volatile and/or non-volatile memory devices. The memory 116 is communicatively coupled to the I/O subsystem 114 via a number of signal paths. Although only a single memory device 116 is illustrated in FIG. 1, the mobile digital information display device 102 may include additional memory devices in other embodiments. Various data and software may be stored in the memory 116. For example, one or more operating systems, applications, programs, libraries, and drivers that make up the software stack executed by the processor 110 may reside in memory 116 during execution.

The communication circuitry 118 of the mobile digital information display device 102 may include any number of devices and circuitry for enabling communications between the mobile digital information display device 102 and other remote computing devices such as a digital information data server 170 and one more mobile computing devices 190 as discussed below. The communication circuitry 118 may be configured to use any one or more communication protocols to communicate with such remote computing devices such as, for example, a wireless local area network communication protocol (e.g., Wi-Fi®), a wireless wide area network communication protocol (e.g., WiMAX), a cellular communication protocol (e.g., Wideband Code Division Multiple Access (W-CDMA)), a mobile satellite communication protocol, and/or other communication protocols.

The data storage 120 may be embodied as any type of device or devices configured for the short-term or long-term storage of data such as, for example, memory devices and circuits, memory cards, hard disk drives, solid-state drives, or other data storage devices. In the illustrative embodiment, the data storage 120 includes a preference database 122 and an information database 124. The preference database 122 stores data usable by the digital information display engine to determine preference criteria for local viewers based on context data. For example, in some embodiments, the preference database 122 may include demographic data, location data, event data, and/or other data that may be used with the context data to determine preference criteria for the inferred and/or actual viewers of the display device 102. The information database 124 includes the digital information (e.g., advertisements, notices, etc.) that may be selected for display on the display device 102. In some embodiments, the digital information is stored in the information database 124 in association with characteristic data that defines particular characteristics of the digital information such as, for example, the language of the digital information, whether the digital information has an active or static presentation, the subject matter, type, or length the digital information, and so forth.

The digital information display engine 130 may be embodied as software, firmware, and associated hardware devices and logic configured to collect and analyze the context data of the mobile digital information display device 102, determine preference criteria for the local viewers/population, and select digital information to display on the display device 102. Illustratively, the digital information display engine 130 includes a preference criteria analysis module or logic 132 and an information selection module or logic 134. The preference criteria analysis module 132 is configured to collect or obtain context data and/or additional data and determine preference criteria for a local population (i.e., the estimated, predicted, or otherwise inferred viewing audience of the display device 102) as a function of the context data. To do so, the preference criteria analysis module 132 may compare the obtained context data of the display device to demographic, location, or other data stored in the preference database 122 to generate or determine the preference criteria. For example, if the context data identifies a current location of the display device, the preference criteria analysis module 132 may compare the location to demographic data stored in the preference database 122 and retrieve pre-established preference criteria for the local demographic population. Alternatively, as discussed below, the preference criteria analysis module 132 may receive preference criteria, or data from which such preference criteria may be determined, from other remote devices or sources.

The information selection module 134 selects the digital information to be displayed from the information database 124 based on the preference criteria determined by the preference criteria analysis module 132. To do so, as discussed above, the information selection module 134 may compare the preference criteria to the pre-determined characteristics of the digital information. Additionally, in some embodiments the information selection module 134 may also use context data to select, or otherwise refine the selection of, the digital information as discussed above.

The digital information display engine 130 controls the front display 140 and the rear display 142 to display the selected digital information thereon. In some embodiments, the front display 140 may be embodied as a front-facing display (e.g., facing toward the front of the vehicle 104). In such embodiments, as discussed in more detail below, the digital information display engine 130 may display the selected digital information, or portions thereof (e.g., text), in a reverse or backward orientation so that drivers viewing the front display 140 through a rear-view mirror are able to discern the digital information properly. Although the illustrative mobile digital information display device 102 includes two displays 140, 142, it should be appreciated that the display device 102 may include a single display or more than two displays in other embodiments. Additionally, the displays 140, 142 may be embodied as any type of display capable of display digital information such as a liquid crystal display (LCD), a light emitting diode (LED) display, a plasma display, a cathode-ray tube (CRT) display, or other type of display device.

In some embodiments, the mobile digital information display device 102 may also include one or more sensors 150 configured to generate sensor data indicative of a context of the display device 102, or from which context of the display device 102 may be determined. For example, the sensors 150 may include one or more condition sensors 152 configured to generate sensor data indicative of a condition of the display device 102 (or of the vehicle 104 to which the display device 102 is secured) such as, for example, whether the display device 102 is in motion, the speed at which the display device 102 is moving, the direction of travel, and/or the like. The sensors 150 may also include one or more environment sensors 154 configured to generate sensor data indicative of a condition of the local environment of the display device 102 such as, for example, whether it is raining, snowing, foggy, sunny, and/or the like. Further, the sensors 150 may include one or more location sensors 156 configured to generate sensor data indicative of the current location or predicted location (e.g., predicted based on navigation data, speed, direction of travel, etc.) of the display device 102. Of course, the sensors 150 may include other types of sensors and/or devices to generate data from which a context of the display device may be determined. For example, in some embodiments, the sensors 150 may include sensors or other devices to generate data indicative of the current time, day, season of the year, or other temporal data.

In some embodiments, the mobile digital information display device 102 may also include one or more peripheral devices 160. Such peripheral devices may include any number of additional input/output devices, interface devices, and/or other peripheral devices. For example, in some embodiments, the peripheral devices 160 may include a driver input device 162, which is usable by a driver of the vehicle 104 to enter data, such as context data, that may be used by the digital information display engine 130 to select the digital information for display. For example, the driver input device 162 may be embodied as a touch screen display that allows the driver to enter selectively data to be considered.

As discussed above, in some embodiments, the system 100 may include the digital information data server 170. The digital information data server 170 may be communicatively coupled to the mobile digital information display device 102 via a network 172. The digital information data server 170 may be embodied as any type of data server capable of performing the functions described herein. As such, the digital information data server 170 may include devices and structures commonly found in data servers, such as processors, memory, and peripheral devices, which are not illustrated in FIG. 1 for clarity of the present disclosure.

In some embodiments, the data server 170 includes a data storage 180 including a preference database 182 and an information database 184. The preference database 182 may be substantially similar to, and include substantially similar data as, the preference database 122 of the display device 102. Similarly, the information database 184 may be substantially similar to, and include substantially similar data as, the information database 124 of the display device 102. In such embodiments, the digital information data server 170 may operate as a remote data server from which the mobile digital information display device 102 may retrieve additional or updated demographic/preference data and/or digital information. In this way, the mobile digital information display device 102 need not store all of the available demographic/preference data and/or digital information. Rather, the display device may retrieve such data from the digital information data server 170 as needed or as periodic updates. For example, only digital information for a particular city may be stored locally on the mobile digital information display device 102. However, should the display device 102 move to another city, the display device 102 may retrieve updated digital information for the new city from the digital information data server 170.

The network 172 may be embodied as any number of various wireless data networks and associated wired networks. For example, the network 172 may be embodied as or otherwise include a wireless local area network (WLAN), a wireless wide area network (WWAN), and/or a publicly-accessible, global network such as the Internet. As such, the network 172 may include any number of additional devices, such as additional computers, routers, and switches, to facilitate communications between the mobile digital information display device 102 and the digital information data server 170.

Further, as discussed above, the system 100 may include one or more mobile computing devices 190 in some embodiments. The mobile computing device 190 may be operated by individuals within the vicinity (e.g., within a particular communication range) of the mobile digital information display device 102. Of course, as the display device 102 moves about, the available mobile computing device 190 may change. As discussed in more detail below, the mobile digital information display device 102 may be configured to identify the available mobile computing devices 190 with the vicinity of the display device 102 and establish communications with such mobile computing devices 190. To do so, in some embodiments, the mobile digital information display device 102 may establish an network 192 with one or more of the mobile computing device 190. Alternatively, the mobile digital information display device 102 may use an existing network 192, for example a cellular network, local WiFi™ "hotspot," or the Internet, to establish communication with the mobile computing device 190.

Once communication with the mobile computing devices 190 is established, the mobile digital information display device 102 may request preference criteria 196 from the mobile computing devices 190. However, in some embodiments, the availability and type of preference criteria 196 of the mobile computing device 190 may be controlled and managed by a privacy management module 194 local to the mobile computing device 190. For example, the mobile computing device 190 may compare the request for preference criteria to a local privacy policy and make a determination whether to provide the requested preference criteria or deny the request. As discussed above, the preference criteria 196 may be embodied as any type of data indicative of a preference, state, nature, or other context of a user, or from which a preference of the user may be determined, of the mobile computing device 190. For example the preference criteria 196 may be embodied as, or otherwise include, data indicative of the gender, age, profession, like/dislikes, purchase history, context, and/or other data related to the user of the mobile computing device 190.

Figure 2:
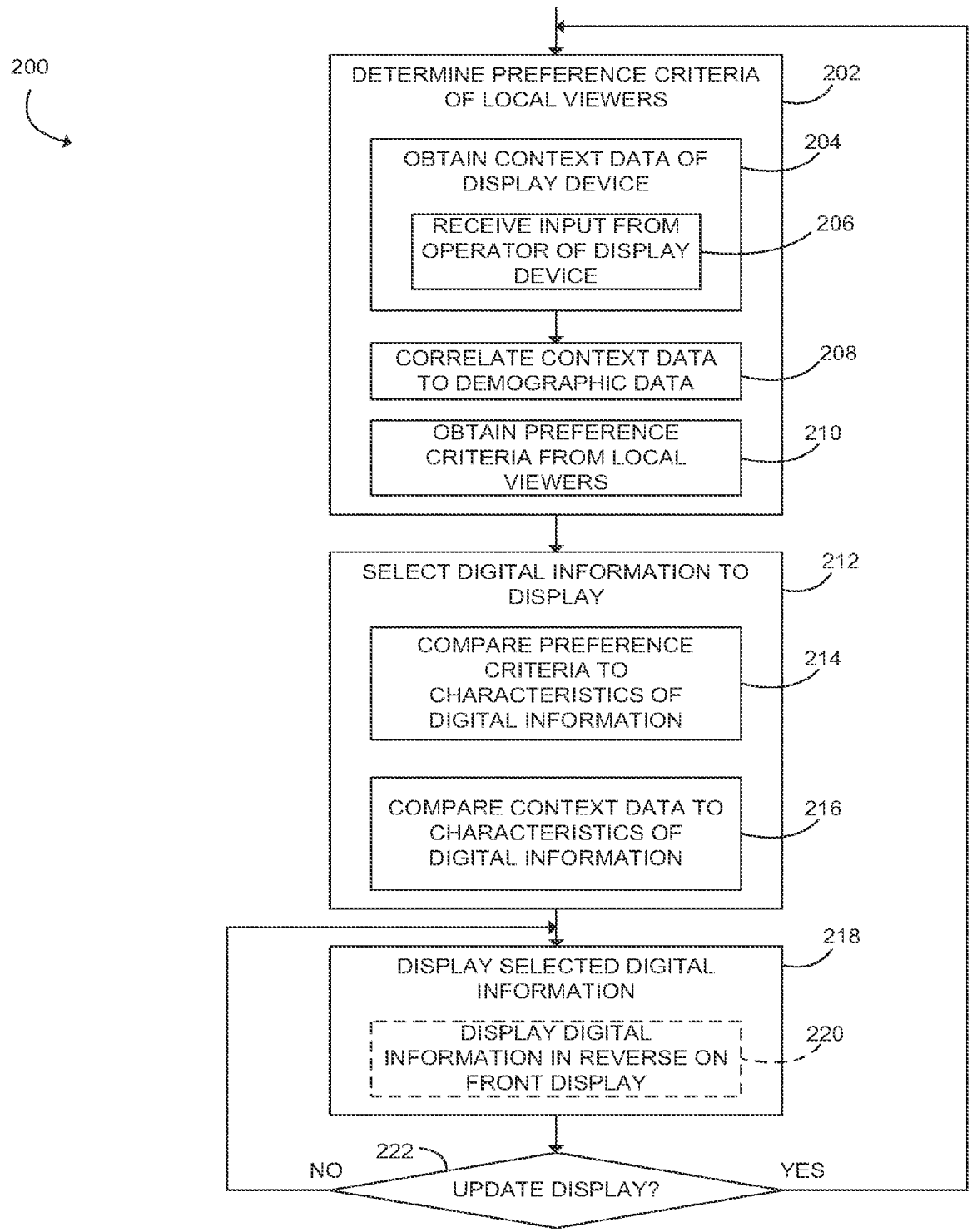
FIG. 2 is a simplified flow diagram of at least one embodiment of a method for selecting and displaying digital information that may be executed by a mobile digital information display device of the system of FIG. 1.

As discussed above, the mobile digital information display device 102 is configured to determine preference criteria of inferred local viewers and display digital information selected based on such preference criteria. To do so, the mobile digital information display device 102 may execute a method 200 for selecting digital information for display as shown in FIG. 2. The method 200 begins with block 202 in which the preference criteria analysis module 132 of the display device 102 determines preference criteria of the likely local viewers. To do so, in one embodiment, the preference criteria analysis module 132 may obtain, or otherwise determine, context data of the mobile digital information display device 102 in block 204. Such context data may be obtained from any one or more sources. For example, in some embodiments, the preference criteria analysis module 132 may receive sensor data from one or more of the sensors 150 (e.g., the condition sensors 152, the environment sensors 154, and the location sensor(s) 156) and/or other remote devices. As discussed above, the context data may be embodied as any type of data that defines a condition or aspect of the display device 102. Additionally, in some embodiments, the preference criteria analysis module 132 may receive input data from the operator of the display device 102 (e.g., the driver of the vehicle 104) in block 206. Such additional input data may be used in conjunction with the collected context data to generate the preference criteria as discussed below.

After the context data is obtained in block 204, the preference criteria analysis module 132 correlates the context data to the demographic and/or other data stored in the preference database 122 to generate or determine the preference criteria in block 208. For example, if the context data includes location data, the preference criteria analysis module 132 may compare the location to the demographic data to determine the preferences of the inferred local population.

Figure 3:
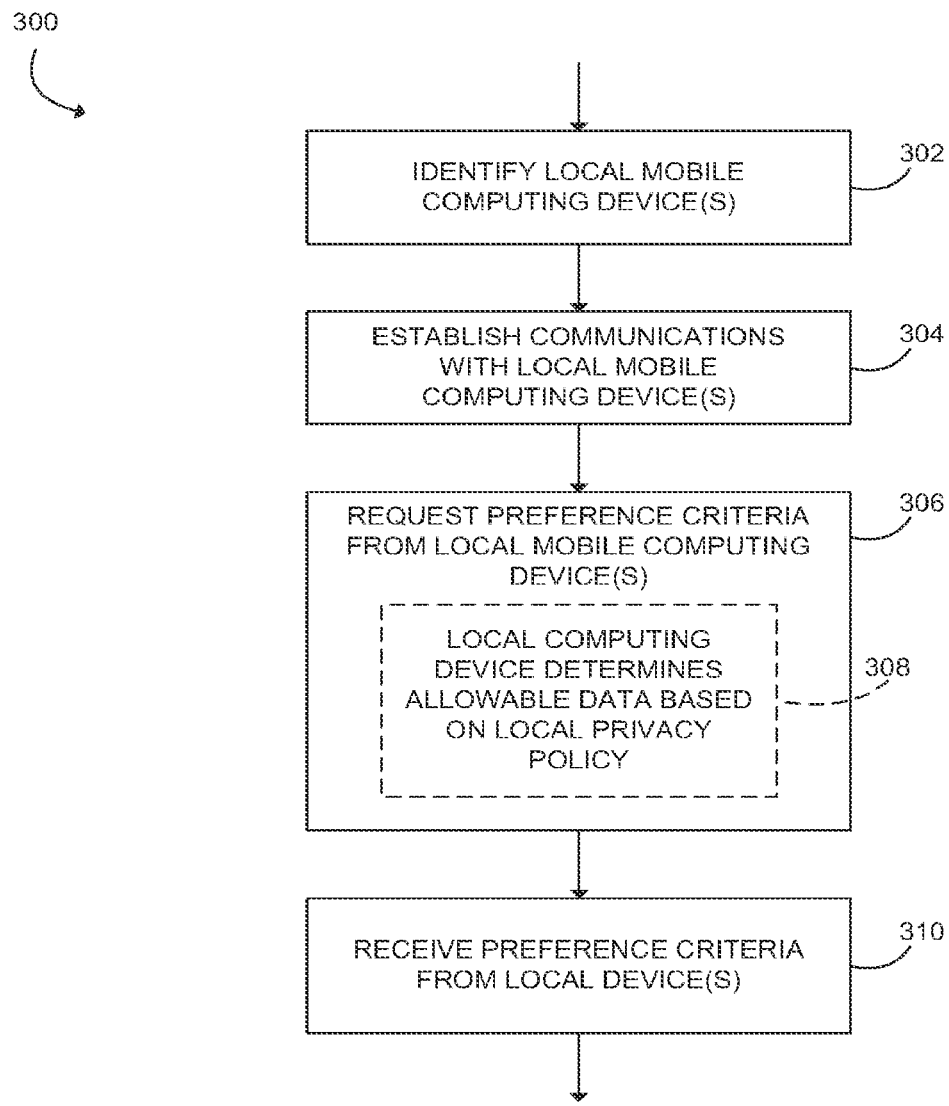
FIG. 3 is a simplified flow diagram of at least one embodiment of a method for communicating with local mobile devices to obtain preference criteria data of users, which may be executed by the mobile digital information display device of the system of FIG. 1.

Additionally or alternatively, the preference criteria analysis module 132 may obtain preference and/or context data for the local viewers from other remote sources in block 210. For example, as discussed above, the mobile digital information display device 102 may communicate with one or more mobile computing device 190 to retrieve preference criteria 196 of the users of the mobile computing devices 190. To do so, the mobile digital information display device 102 may execute a method 300 for establishing communications with mobile computing devices 190 as shown in FIG. 3. The method 300 begins with block 302 in which the mobile digital information display device 102 identifies the local mobile computing devices 190. The display device 102 may use any suitable methodology to determine those mobile computing devices 190 that are nearby the display device 102 at a particular time. For example, in some embodiments, the display device 102 may monitor publically-available local area networks as the display device 102 is moved about. Additionally or alternatively, the display device 102 may establish or otherwise provide the ad hoc network 192, which may be joined by any local mobile computing device 190. Regardless, once the available local mobile computing devices 190 have been identified in block 302, the display device 102 establishes communications with the mobile computing devices 190 in block 304. The display device 102 and the mobile computing devices 190 may use any suitable communication protocol to effect communications over the ad network 192 or other communication channel.

After communications have been established with the local module computing devices 190, the mobile digital information display device 102 requests the preference criteria 196 and/or other context data from the local mobile computing device 190 in block 306. As discussed above, the mobile computing devices 190 may include a privacy management module 194, which controls access to the preference criteria 196. If so, the mobile computing device 190 determines the allowable data in block 308 based on a local privacy policy or other mechanism and transmits such data to the mobile digital information display device 102. The preference criteria 196 and/or other context data is received from the local mobile computing devices 190 in block 310, and the mobile digital information display device 102 may store the retrieved preference criteria 196 in the preference database 122.

Referring now back to FIG. 2, after the preference criteria analysis module has determined the preference criteria for the local viewers in block 202, the method 200 advances to block 212 in which the information selection module 134 of the display device 102 selects the digital information to be displayed. To do so, in block 214, the information selection module 134 may compare the preference criteria to characteristics of the digital information stored in the information database 124. As discussed above, the digital information stored in the information database 124 may be stored in association with pre-determined characteristics of the digital information (e.g., the subject matter, type, or language of the digital information). Of course, such comparison may generate multiple digital information that meet the preference criteria. As such, the information selection module 134 may use any suitable methodology to select the digital information from the digital information meeting the preference criteria (e.g., the number of times the digital information has been displayed over a predetermined period, the time since the digital information was last displayed, the content of the digital information, the cost value or profit associated with the digital information, etc.). Additionally, in some embodiments, the information selection module 134 may compare context data obtained by the preference criteria analysis module 132 (or obtained directly by the information selection module 134) to the characteristics of the digital information to further refine the selection of the digital information in block 216. For example, as discussed above, if the mobile digital information display device 102 is stationary, digital information having an active presentation may be selected.

After the digital information has been selected in block 212, the selected digital information is displayed on the displays 140, 142. As discussed above, in embodiments wherein the front display 140 is embodied as a front-facing display, the digital information display engine 130 may display the digital information on the front display 140 in a reverse orientation. For example, text of the digital information may be displayed backwards (e.g., in a left-right reversed orientation) such that drivers ahead of the vehicle 104 are able to view the digital information on the front display 140 through a rear-view mirror in the correct orientation.

In block 222, the mobile digital information display device 102 determines whether to update the display of the digital information. The display device 102 may use any suitable methodology to determine when/if to update the display of the digital information. For example, the display device 102 may be configured to update or change the display based on temporal (e.g., every five minutes) or location-based criteria. Alternatively, the mobile digital information display device 102 may update the display in response to particular events, such as the receipt of new context or preference criteria. If the display is not updated, the method 200 loops back to block 218 in which the current digital information continues to be displayed on the displays 140, 142. However, if the mobile digital information display device 102 determines to update the displayed digital information, the method 200 loops back to block 202 in which the new preference criteria is determined.

Figure 4:
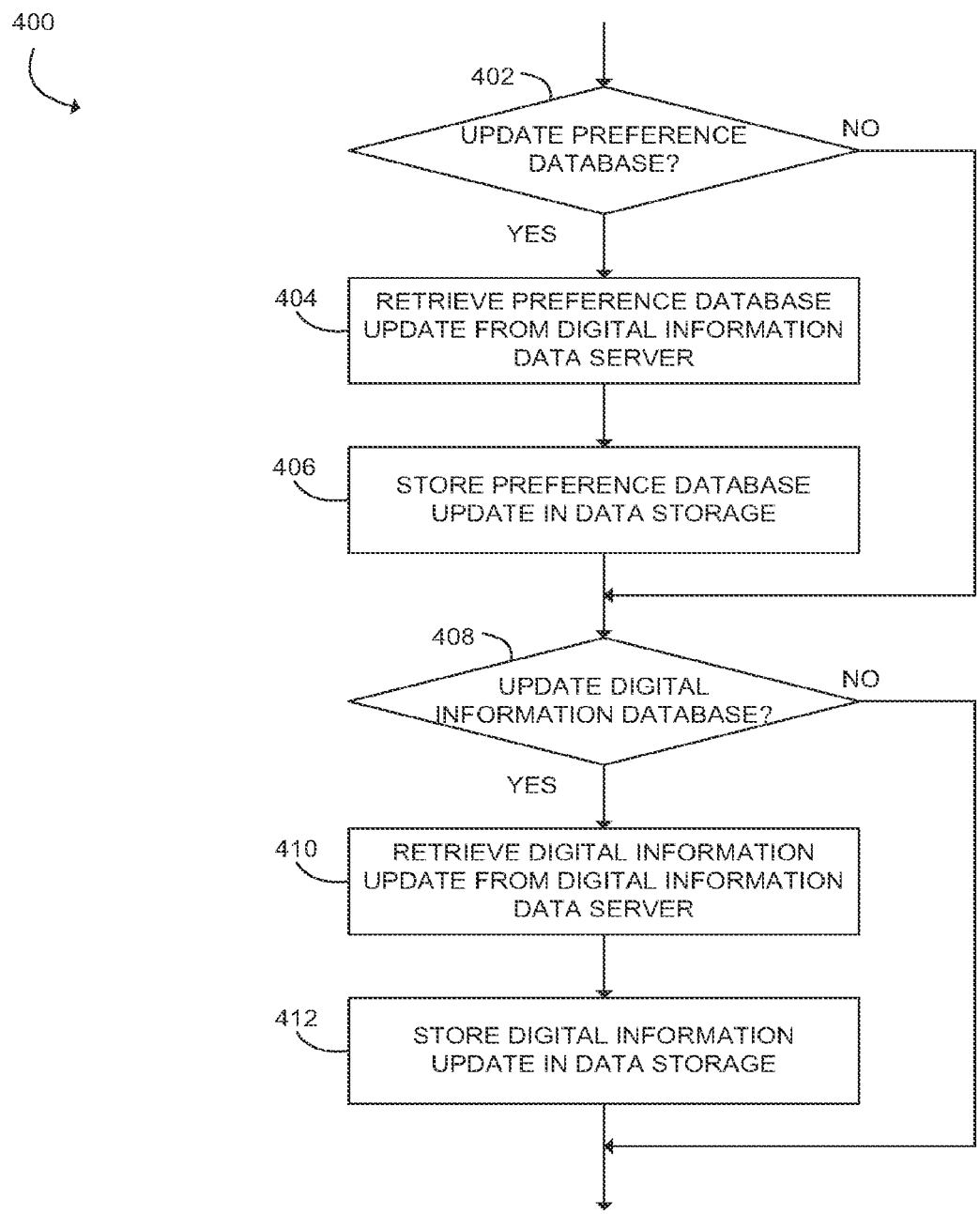
FIG. 4 is a simplified flow diagram of at least one embodiment of a method for updating databases of the mobile digital information display device of the system of FIG. 1.

Referring now to FIG. 4, in some embodiments, the mobile digital information display device 102 may be configured to periodically or responsively update the preference database 122 and/or the information database 124 by communicating with the digital information data server 170. To do so, the mobile digital information display device 102 may execute a method 400 for updating the data storage 120. The method 400 begins with block 402 in which the mobile digital information display device 102 determines whether to update the preference database 122. As discussed above, the mobile digital information display device 102 may update the preference database 122 and/or information database 124 periodically or in response to a change in the context of the mobile digital information display device 102 (e.g., the display device 102 is moved to a new city or other new location). If the display device 102 determines to update the preference database 122, the method 400 advances to block 404 in which the mobile digital information display device 102 communicates with the digital information data server 170 over the network 172 to retrieve a preference database update. The display device 102 subsequently stores the preference database update in the data storage 120 in block 406.

In block 408, the mobile digital information display device 102 determines whether to update the information database 124. If so, the method 400 advances to block 410 in which the mobile digital information display device 102 communicates with the digital information data server 170 over the network 172 to retrieve a digital information update. The display device 102 subsequently stores the digital information update in the data storage 120 in block 412.

Figure 5:
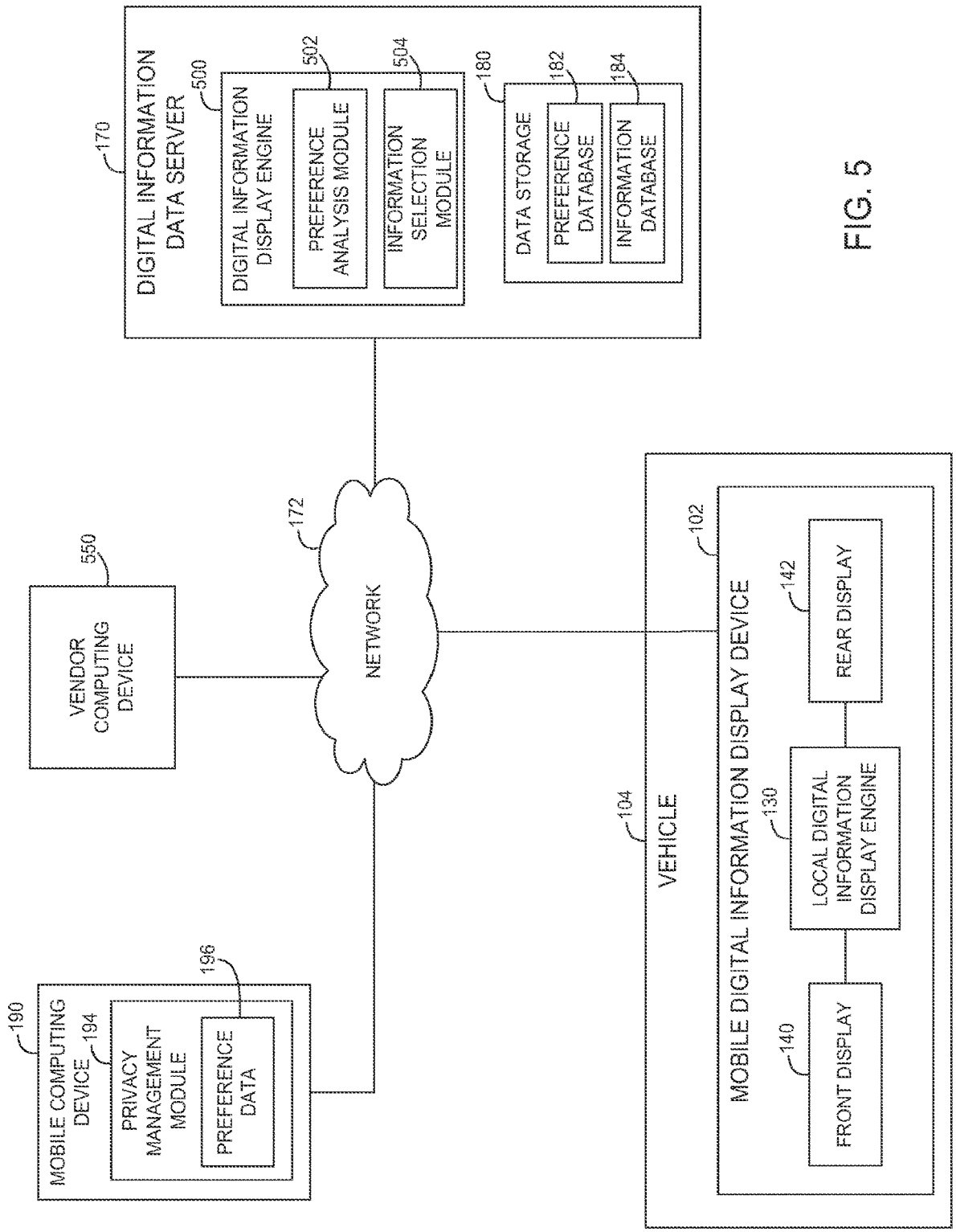
FIG. 5 is a simplified block diagram of at least one additional embodiment of a system for selecting and displaying digital information on a mobile digital information display.

Referring now to FIG. 5, in some embodiments, the digital information display engine may be located on the digital information data server 170 rather than, or in addition to, the mobile digital information display device 102. In such embodiments, the digital information data server 170 includes a digital information display engine 500 having a preference criteria analysis module 502 and an information selection module 504. The preference criteria analysis module 502 is substantially similar to the preference criteria analysis module 132 of the mobile digital information display device 102. Similarly, the information selection module 504 is substantially similar to the information selection module 134 of the mobile digital information display device 102. As such, determination of the preference criteria of the local viewers of the mobile digital information display device 102 and the selection of the digital information to be displayed by the display device 102 is performed by the digital information data server 170.

In the embodiment of FIG. 5, the digital information data server is configured to determine the preference criteria, select the digital information based thereon, and transmit the digital information to the mobile digital information display device 102. To facilitate such functionality, the mobile digital information display device 102 may execute a method 600 for obtaining digital information from the digital information data server 170. The method 600 begins with block 602 in which the mobile digital information display device 102 obtains context data of the display device 102 as discussed above in regard to block 204 of method 200. In block 604, the mobile digital information display device 102 transmits the context data (and any additional data usable to determine the preference criteria) to the digital information data server 170.

As discussed in more detail below, the digital information data server 170 selects the digital information to be displayed by the mobile digital information display device 102, which is received by the display device 102 in block 606. The mobile digital information display device 102 subsequently displays the digital information in block 608 as discussed above with regard to blocks 218, 220 of method 200. In block 610, the mobile digital information display device 102 determines whether to update the display of the digital information in a manner similar to that discussed above in regard to block 222 of the method 200. If the display is not updated, the method 600 loops back to block 608 in which the current digital information continues to be displayed on the displays 140, 140. However, if the mobile digital information display device 102 determines to update the displayed digital information, the method 600 loops back to block 602 in which the new/additional context data is obtained and transmitted to the digital information data server 170.

Figure 7:
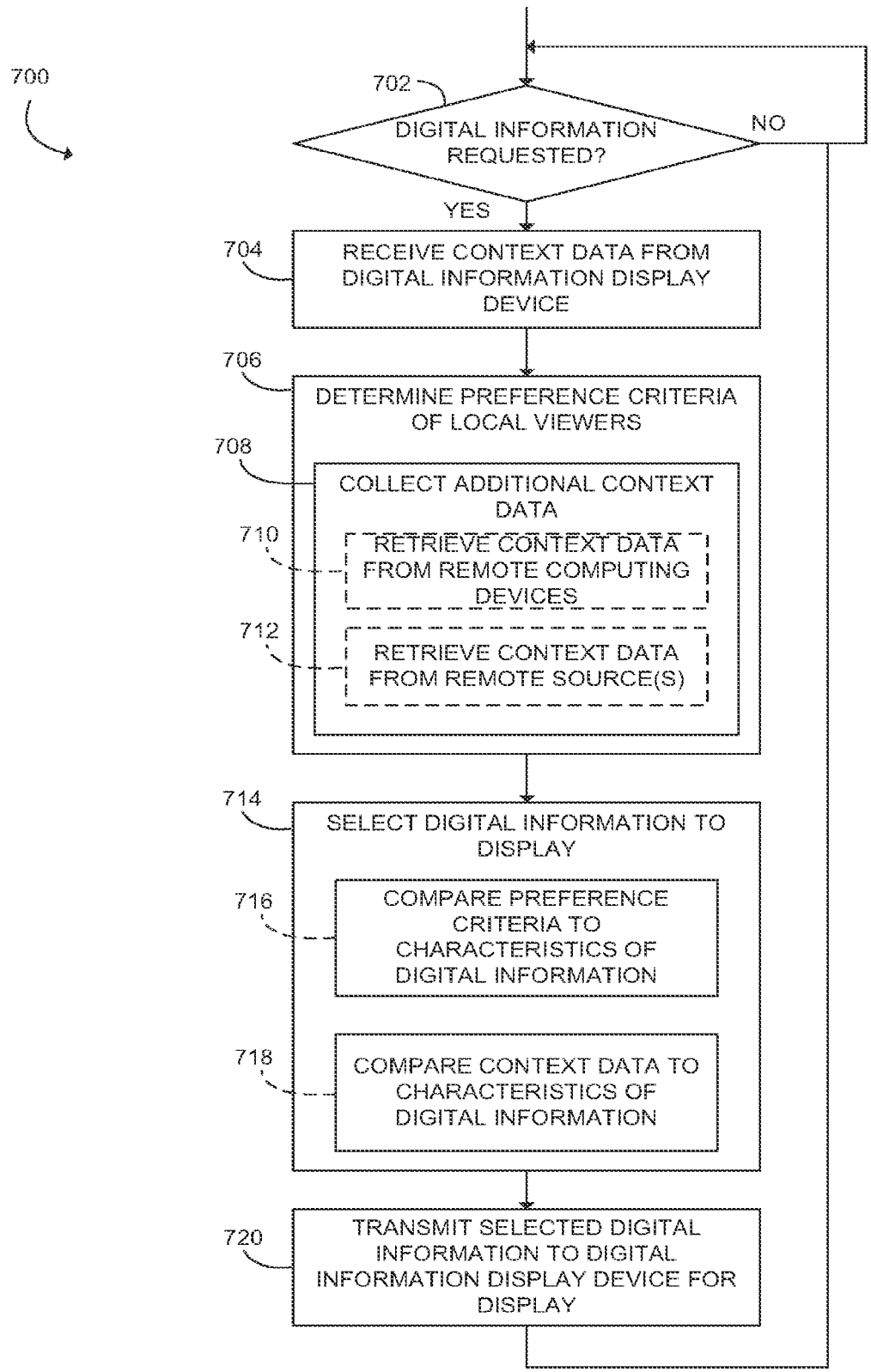
FIG. 7 is a simplified flow diagram of at least one embodiment of a method for selecting digital information to be displayed, which may be executed by a digital information data server of the system of FIG. 5.
Figure 8:
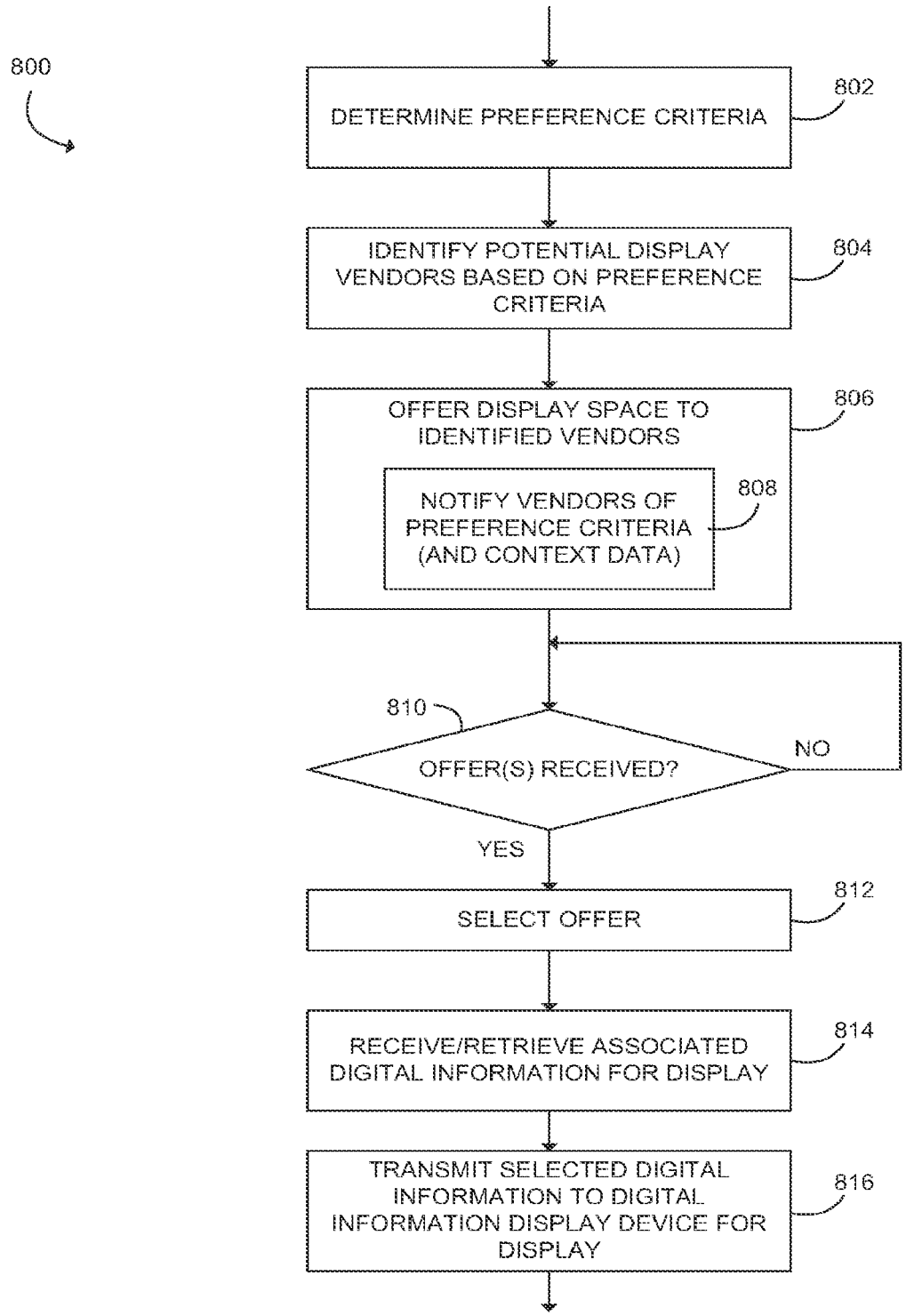
FIG. 8 is a simplified flow diagram of at least one embodiment of a method for offering display space of the mobile digital information display device to a vendor that may be executed by the digital information data server of the system of FIG. 5.

Referring now to FIG. 7, in the embodiment of FIG. 5, the digital information data server 170 may execute a method 700 for selecting digital information to be displayed on the mobile digital information display device 102. The method 700 begins with block 702 in which the digital information data server 170 determines whether a request for digital information has been received from the display device 102. The display device 102 may periodically or responsively send requests for digital information to the digital information data server 170. Of course, in other embodiments, the digital information data server 170 may "push" the digital information for display to the display device 102 without regard to receiving a specific request for such digital information from the display device 102.

Figure 6:
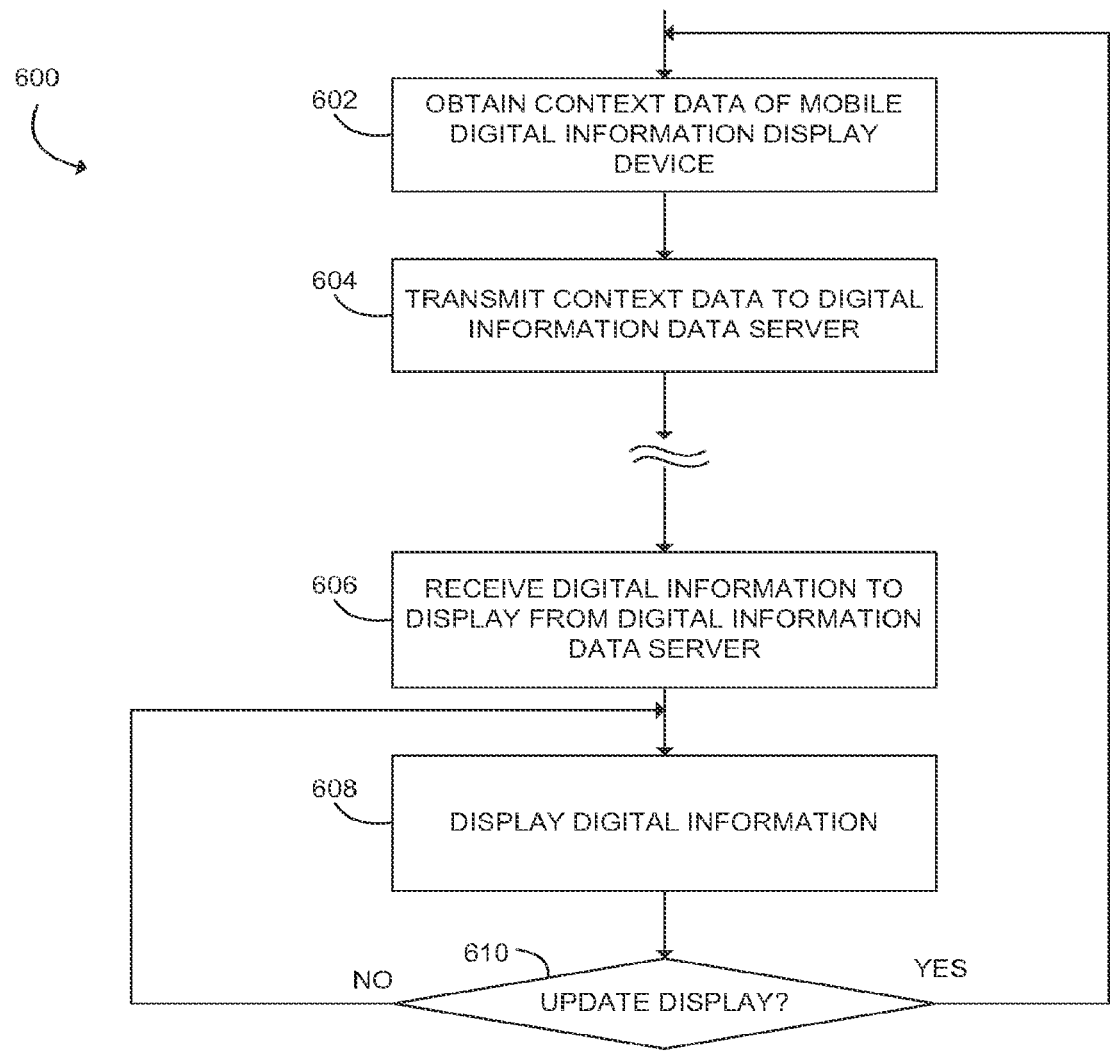
FIG. 6 is a simplified flow diagram of at least one embodiment of a method for obtaining digital information that may be executed by a mobile digital information display device of the system of FIG. 5.

If the digital information data server 170 does receive a request for digital information from the display device 102, the method 700 advances to block 704 in which the digital information data server 170 receives context data from the mobile digital information display device 102. As discussed above in regard to FIG. 6, the display device 102 is configured to collect or obtain context data of the display device 102 and transmit the obtained context data to the digital information data server 170.

In block 706, the preference criteria analysis module 502 of the digital information data server 170 determines preference criteria of the likely or inferred local viewers. To do so, the preference criteria analysis module 502 may collect or obtain additional context data in some embodiments in block 710. The digital information data server 170 may obtain preference criteria of the local viewers of the display device 102 from other remote computing devices in block 710. For example, the digital information data server 170 may communicate with the one or more mobile computing device 190 to retrieve the preference criteria 196 of the users of the mobile computing devices 190. To do so, digital information data server 170 may execute the method 300 for establishing communications with the mobile computing devices 190, and retrieving preference criteria therefrom, as discussed above with regard to FIG. 3. Additionally, in block 712, the digital information data server 170 may retrieve context data of the mobile digital information display device 102 from other remote sources. For example, in some embodiments, the digital information data server 170 may be configured to communicate with remote traffic, navigation, and/or weather services to retrieve corresponding information regarding the current or predicted locations of the display device 102. Such additional context information may be used with the context information received from the mobile digital information display device 102 to determine preference criteria by correlating the context data to the demographic and/or other data stored in the preference database 182 to generate or determine the preference criteria as discussed above with regard to block 208 of method 200.

In block 714, the information selection module 504 selects the digital information to be displayed by the display device 102. To do so, in block 716, the information selection module 504 may compare the determined preference criteria to characteristics of the digital information stored in the information database 184. Additionally, in some embodiments, the information selection module 504 may compare context data obtained by the preference criteria analysis module 502 (or obtained directly by the information selection module 504) to the characteristics of the digital information to further refine the selection of the digital information in block 718 in a manner similar to that described above with regard to block 216 of method 200.

After the digital information data server 170 has selected the digital information, the data server 170 transmits the selected digital information to the mobile digital information display device 102 in block 720. In some embodiments, the digital information data server 170 may select and transmit multiple digital information to allow the mobile digital information display device 102 to display digital information for some period of time without requireing constant communication with the digital information data server 170. Additionally, in some embodiments, the digital information data server 170 may be configured to predict or estimate a future location of the mobile digital information display device 102 based on, for example, the received context data and navigation or map data, select digital information for the future locations, and transmit the digital information to the display device 102 prior to the display device 102 arriving at the future location. In this way, the mobile digital information display device 102 may be pre-provisioned with digital information so as to avoid congestion of the communication channel and slow responsiveness of the display of the digital information.

In some embodiments, the system 100 of FIG. 5 may further include one or more vendor computing device 550 that may communicate with the digital information data server 170 to purchase or otherwise select advertisement space (or time of display) on the mobile digital information display device 102. Such purchase of advertisement space may be conducted as an "at the moment" purchase or selection. For example, in some embodiments, the digital information data server 170 may execute a method 800 for offering display space of the mobile digital information display device 102 to a vendor. The method 800 begins with block 802 in which the digital information data server 170 determines the preference criteria for the inferred local population of the mobile digital information display device as discussed above with regard to block 706 of method 700. In block 804, the digital information data server 170 identifies potential display vendors (e.g., companies requesting advertisement space) based on the determined preference criteria. In some embodiments, the vendors may select, or otherwise provide, preference criteria that they are interested in, which may be saved by the digital information data server 170. For example, a company selling alcoholic beverages may select preference criteria indicative of male viewers of a particular age range. In block 806, the digital information data server 170 communicates with identified vendors to offer the display space on the mobile digital information display device 102. In some embodiments, the digital information data server 170 may also send the determined preference criteria and context data to the vendor computing device 550 with the offer for the display space in block 808.

In block 810, the digital information data server 170 determines whether any offers have been received from the vendors 550. If so, the digital information data server 170 selects an offer form those received (e.g., the vendor offering the highest dollar amount for the display space) and receives or retrieves the associated digital information for display in block 814. That is, in some embodiments, the vendor 550 may transmit the digital information to be displayed with the offer. Alternatively, the digital information may already be stored in the information database 184. Additionally, it should be appreciated that in other embodiments, the vendors 550 may set up pre-established bidding requirements and limits for the display space based on the preference criteria. In such embodiments, the digital information data server 170 need not communicate with the vendor computing device 550 to determine which offer to accept. Regardless, in block 816, the digital information data server 170 transmits the selected digital information to the mobile digital information display device for display thereon in block 816.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

EXAMPLES

Illustrative examples of the devices, systems, and methods disclosed herein are provided below. An embodiment of the devices, systems, and methods may include any one or more, and any combination of, the examples described below.

In one example, a mobile digital information display device for displaying information to local viewers may include a display, a database, and a digital information display engine. In an example, the database may have digital information storage therein. In an example, the digital information display engine may include a preference criteria analysis logic unit and an information selection logic unit. In an example, the preference criteria analysis logic unit may (i) obtain context data associated with the mobile digital information display device and (ii) determine, as a function of the context data, preference criteria for selecting digital information to be displayed on the mobile digital information display device. In an example, the information selection logic unit may select digital information to be displayed, from the database, as a function of the preference criteria. Additionally, in an example, the digital information display engine may display the selected information on the display of the mobile digital information display device.

In an example, the preference criteria analysis logic unit is to obtain context data associated with the mobile digital information display device while the mobile digital information display device is moving from a first location to a second location and the digital information display engine to display the selected information on the display of the mobile digital information display device while the mobile digital information display device is in motion. Additionally, in an example, the mobile digital information display device is secured to a vehicle. In an example, to obtain context data may include to receive sensor data from at least one of a vehicle condition sensor, a vehicle environment sensor, and a vehicle location sensor. In an example, to obtain context data may include to receive an input from an operator or passenger of the vehicle.

Additionally, in an example, the mobile digital information display device may be configured to be worn or carried by an individual. In an example, the digital information may include an advertisement. In an example, to obtain context data may include to receive context data indicative of at least one of a location, speed, and direction of travel of the mobile digital information display device. In an example, to obtain context data may include to receive context data indicative of an environmental condition near the current location of the mobile digital information display. In an example, the context data may include temporal data. In an example, the temporal data is indicative of at least one of the current time of day, day of week, and month of the year.

Additionally, in an example, the preference criteria analysis logic unit may identify a mobile computing device located within a reference range of the mobile digital information display device, establish communications between the mobile digital information display device and the mobile computing device, and receive, from the mobile computing device, preference criteria data indicative of a preference of a user of the mobile computing device. In an example, to identify the mobile computing device may include to identify at least one mobile computing device of a local ad hoc network to which the mobile digital information display device is connected. In an example, the mobile computing device may include a computing device of a vehicle. In an example, to establish wireless communications may include to establish an ad hoc network. In an example, to receive preference criteria data from the mobile computing device may include to receive descriptive information of a user of the mobile computing device. In an example, to receive descriptive information of the user may include to receive data indicative of at least one of a gender, an age, and a preference of the user of the mobile computing device. In an example, the display may include a front-facing display and a rear-facing display and the digital information display engine may to display the selected information on the front-facing display and on the rear-facing display. In an example, the digital information display engine may display the information on the front-facing display in a reverse orientation.

In another example, a server for selecting digital information for display on a mobile digital information display device may include a data storage comprising an information database and a digital information display engine. The digital information display engine may include (i) a preference criteria analysis logic unit to obtain context data associated with a mobile digital information display device and generate preference criteria as a function of the context data and (ii) information selection logic to select digital information from the information database as function of the selection criteria. The digital information display engine may transmit the selected digital information to the mobile digital information display device for display on a display of the mobile digital information display device.

In an example, the preference criteria analysis logic unit is to obtain context data associated with a mobile digital information display device while the mobile digital information display device is moving from a first location to a second location. In an example, to obtain context data may include to receive, from the mobile digital information display device, sensor data from at least one of a vehicle condition sensor, a vehicle environment sensor, and a vehicle location sensor. In an example, the digital information may include an advertisement. In an example, the context data may include context data indicative of at least one of a location, speed, and direction of travel of the mobile digital information display device. In an example, the context data may include context data indicative of an environmental condition near the current location of the mobile digital information display. In an example, the context data may include temporal data. In an example, the temporal data is indicative of at least one of the current time of day, day of week, and month of the year.

Additionally, in an example, the preference criteria analysis logic unit may identify a mobile computing device located within a reference range of the mobile digital information display device, establish communications with the mobile computing device, and receive preference criteria data from the mobile computing device. In an example, the mobile computing device may include a computing device of a vehicle. In an example, the preference criteria data from the mobile computing device may include data indicative of a current location of the mobile computing device. In an example, the preference criteria data from the mobile computing device may include descriptive information of a user of the mobile computing device. In an example, the descriptive information may include data indicative of at least one of a gender, an age, and a preference of the user of the mobile computing device. In an example, the digital information display engine is to determine a navigation path of the mobile digital display device, wherein the context data may include a location on the determined navigation path. In an example, the digital information display engine may determine potential vendors of digital information based on the preference criteria, present, to the potential vendors, an offer to display information from the potential vendors, the offer including the preference criteria, obtain digital information for display from a vendor in response to the offer, and transmit the digital information to the mobile digital information display device.

In another example, a method for displaying information to local viewers may include determining preference criteria for local viewers of a mobile digital information display device, selecting digital information to be displayed on the mobile digital information display device as a function of the preference criteria, and displaying the selected information on a display of the mobile digital information device. In an example, determining preference criteria may include determining preference criteria for local viewers of a mobile digital information display device while the mobile digital information display is moving from a first location to a second location. In an example, displaying the selected information may include displaying the selected information on a display of the mobile digital information device while the mobile digital information display device is in motion.

Additionally, in an example, determining preference criteria may include obtaining context data of the mobile digital information display device and comparing the context data to demographic data to determine the preference criteria. In an example, obtaining context data comprising receiving sensor data from at least one of a vehicle condition sensor, a vehicle environment sensor, and a vehicle location sensor. In an example, obtaining context data may include receiving context data indicative of at least one of a current location and a predicted future location of the mobile digital information display device. In an example, obtaining context data further may include retrieving event data indicative of an event occurring near at least one of the current location and the predicted future location of the mobile digital information display device. In an example, obtaining context data may include receiving context data indicative of an environmental condition of the current location of the mobile digital information display. In an example, obtaining context data may include receiving temporal data. In an example, the temporal data is indicative of at least one of the current time of day, day of week, and month of the year. In an example, obtaining context data may include receiving an input from an operator or passenger of a vehicle to which the mobile digital information display device is secured.

Additionally, in an example, determining preference criteria may include identifying a mobile computing device located within a reference range of the mobile digital information display device, establishing communications between the mobile digital information display device and the mobile computing device, and receiving preference criteria from the mobile computing device. In an example, identifying the mobile computing device may include identifying at least one mobile computing device of a local ad hoc network to which the mobile digital information display device is connected. In an example, identifying the mobile computing device may include identifying a computing device of a vehicle. In an example, establishing communications may include establishing an ad hoc wireless network. In an example, receiving preference criteria from the mobile computing device may include receiving preference criteria indicative of a current location of the mobile computing device. In an example, receiving preference criteria from the mobile computing device may include receiving descriptive information of a user of the mobile computing device. In an example, receiving descriptive information of the user may include receiving data indicative of at least one of a gender, an age, and likes/dislikes of the user of the mobile computing device. In an example, selecting digital information may include comparing the preference criteria to pre-established characteristics of the digital information. In an example, selecting digital information may include comparing the context data to pre-established characteristics of the digital information.

Additionally, in an example, comparing the context data may include comparing the pre-established characteristics of the digital information to at least one of data indicative of whether the digital information display device is in motion and data indicative of an environmental condition of the current location of the digital information display device. In an example, obtaining context data may include obtaining context data associated with a mobile digital information display device secured to a vehicle. In an example, obtaining context data comprise obtaining context data associated with a mobile digital information display device worn or carried by an individual. In an example, selecting digital information to be displayed may include selecting an advertisement to be displayed. In an example, displaying the selected information may include displaying the selected information on a front-facing display and on a rear-facing display of the mobile digital information display device. In an example, displaying the selected information of the front-facing display may include displaying the information on the front-facing display in a reverse orientation.

Additionally, in an example, the method may further include transmitting the preference criteria to a digital information data server and receiving the selected digital information from the digital information data server in response to the transmitted preference criteria. In an example, selecting digital information may include selecting, on a digital information data server remote from the mobile digital information display, digital information to be displayed on the mobile digital information display device. In an example, the method may further include transmitting the selected digital information to the mobile digital information display device. In an example, the method may further include obtaining, on the digital information data server, additional context data associated with at least one of a location, environment, or local population of the location at which the mobile digital information display device is currently located. In an example, the method may further include determining, on the digital information data server, a navigation path of the mobile digital display device, wherein the context data may include a location on the determined navigation path. In an example, the method may additionally include determining potential vendors of digital information based on the preference criteria, presenting, to the potential vendors, an offer to display information from the potential vendors, the offer including the preference criteria, obtaining digital information for display from a vendor in response to the offer, and transmitting the digital information to the mobile digital information display device.

The invention claimed is:

1. A vehicle comprising:
a digital display to present information, the digital display to face an exterior of the vehicle;
preference criteria analysis logic circuitry to:
establish communication with a plurality of mobile computing devices within a vicinity of, but external to, the vehicle, different ones of the plurality of mobile computing devices associated with different ones of a plurality of users, the communication based on an ad hoc network established by the vehicle based on direct connections between the vehicle and ones of the plurality of mobile computing devices when the ones of the plurality of mobile computing devices are within communication range of the vehicle;
request, following establishment of communication with the plurality of mobile computing devices, preference criteria data from the plurality of mobile computing devices, the preference criteria data indicative of one or more demographic characteristics of the plurality of users of the plurality of mobile computing devices within the vicinity of the vehicle; and
determine, as a function of an aggregate of the preference criteria data of ones of the plurality of users of corresponding ones of the plurality of mobile computing devices within the vicinity of the vehicle, preference criteria for selecting the information to be presented on the digital display, the preference criteria data provided by the corresponding ones of the plurality of mobile computing devices in response to the request; and
information selection logic circuitry to select the information to be presented as a function of the preference criteria, the digital display to present the selected information for viewing outside the vehicle.

2. The vehicle of claim 1, wherein the preference criteria analysis logic circuitry is to:
obtain context data associated with the vehicle while the vehicle is moving from a first location to a second location; and
determine the preference criteria as a function of the preference criteria data and the context data, the digital display to present the selected information while the vehicle is in motion.

3. The vehicle of claim 2, wherein the context data is based on sensor data obtained from at least one of a vehicle condition sensor, a vehicle environment sensor, or a vehicle location sensor.

4. The vehicle of claim 1, wherein one of the plurality of mobile computing devices includes a computing device of a different vehicle.

5. The vehicle of claim 1, wherein the digital display includes a front-facing digital display and a rear-facing digital display, the selected information to be presented on the front-facing digital display and on the rear-facing digital display.

6. The vehicle of claim 5, wherein the front-facing digital display is to present the selected information in a reverse orientation to enable a correct orientation when viewed through a mirror.

7. The vehicle of claim 1, wherein the one or more demographic characteristics includes one or more of a gender, an age, or a nationality of the plurality of users.

8. A method comprising:
establishing, by a vehicle, communication with a plurality of mobile computing devices within a vicinity of, but external to, the vehicle, different ones of the plurality of mobile computing devices associated with different ones of a plurality of users, the communication based on an ad hoc network established by the vehicle based on direct connections between the vehicle and ones of the plurality of mobile computing devices when the ones of the plurality of mobile computing devices are within communication range of the vehicle;
requesting, by the vehicle following establishment of communication with the plurality of mobile computing devices, preference criteria data from the plurality of mobile computing devices, the preference criteria data indicative of one or more demographic characteristics of the plurality of users of the plurality of mobile computing devices within the vicinity of the vehicle;
determining, by the vehicle, preference criteria for local viewers of the vehicle based on an aggregate of the preference criteria data of ones of the plurality of users of corresponding ones of the plurality of mobile computing devices within the vicinity of the vehicle, the preference criteria data provided by the corresponding ones of the plurality of mobile computing devices in response to the request; and
selecting digital information to be displayed on a digital display of the vehicle as a function of the preference criteria, the digital display to face an exterior of the vehicle.

9. The method of claim 8, wherein the determining of the preference criteria for the local viewers of the vehicle is performed while the vehicle is moving from a first location to a second location, and further including displaying the selected information on the digital display while the vehicle is in motion.

10. The method of claim 8, further including:
obtaining context data of the vehicle; and
comparing the context data to demographic data to determine the preference criteria.

11. The method of claim 10, wherein the context data includes data indicative of at least one of a current location or a predicted future location of the vehicle.

12. The method of claim 11, wherein the context data includes event data indicative of an event occurring near at least one of the current location and or the predicted future location of the vehicle.

13. The method of claim 8, wherein the selecting of the digital information includes comparing the preference criteria to pre-established characteristics of the digital information.

14. The method of claim 8, wherein the selecting of the digital information includes comparing context data to pre-established characteristics of the digital information.

15. The method of claim 11, further including displaying the selected information on a front-facing portion of the digital display and on a rear-facing portion of the digital display of the vehicle.

16. One or more machine-readable storage device comprising a plurality of instructions that, when executed, cause at least one processor of a vehicle to:
obtain context data associated with the vehicle;
identify a plurality of mobile computing devices associated with a plurality of local users, the plurality of mobile computing devices in a vicinity of, but external to, the vehicle;

establish communications with the plurality of mobile computing devices, the communication based on an ad hoc network established by the vehicle based on direct connections between the vehicle and ones of the plurality of mobile computing devices when the ones of the plurality of mobile computing devices are within communication range of the vehicle;

request, following establishment of communications with the plurality of mobile computing devices, preference criteria data from the plurality of mobile computing devices the preference criteria data indicative of one or more demographic characteristics of the plurality of local users of the plurality of mobile computing devices within the vicinity of the vehicle;

generate preference criteria as a function of the context data and an aggregate of the preference criteria data of ones of the plurality of local users of the mobile computing devices within the vicinity of the vehicle, the preference criteria data provided by the corresponding ones of the plurality of mobile computing devices in response to the request;

select digital information from an information database as a function of the preference criteria; and cause display of the selected digital information on a digital display of the vehicle.

17. The one or more machine-readable storage device of claim 16, wherein the context data is based on sensor data obtained from at least one of a vehicle condition sensor, a vehicle environment sensor, or a vehicle location sensor.

\* \* \* \* \*